March 15, 1960 G. A. LYON, JR 2,928,694
WIRE SPOKED WHEEL SIMULATING WHEEL COVER
Filed Jan. 17, 1955 2 Sheets-Sheet 1
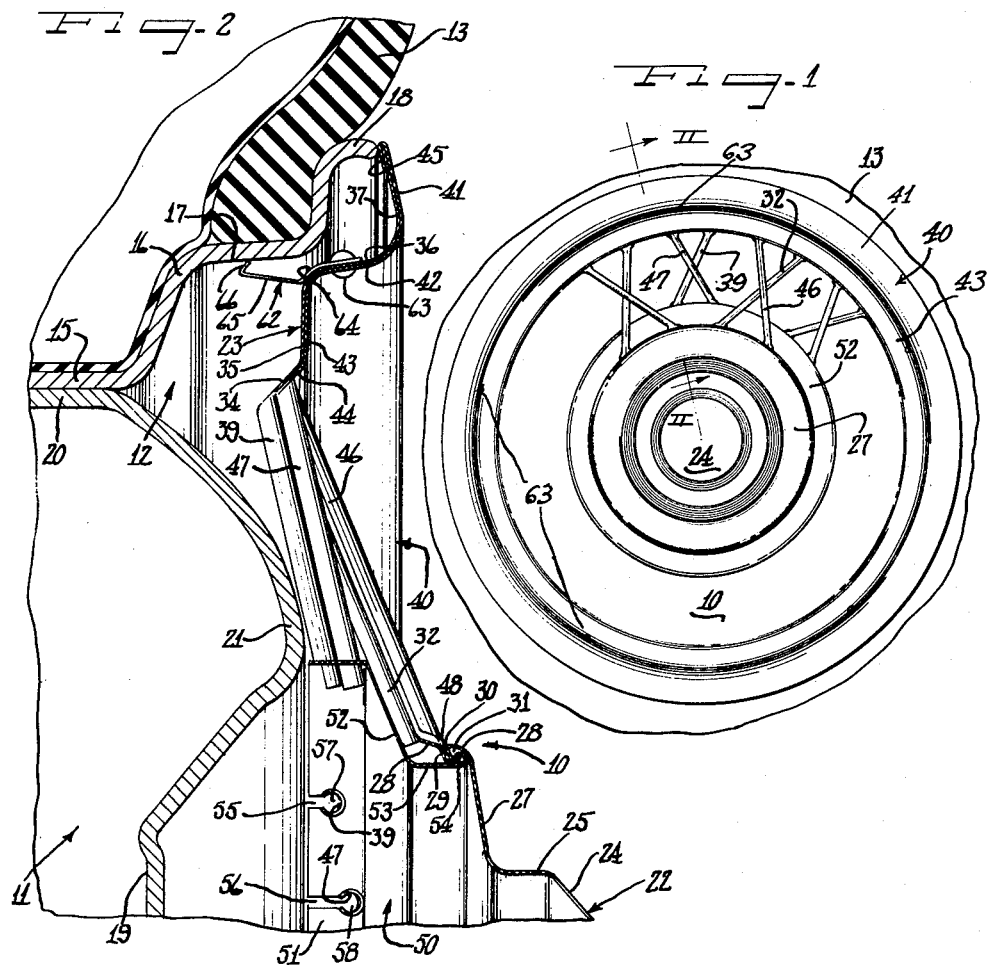
Inventor
George A. Lyon, Jr

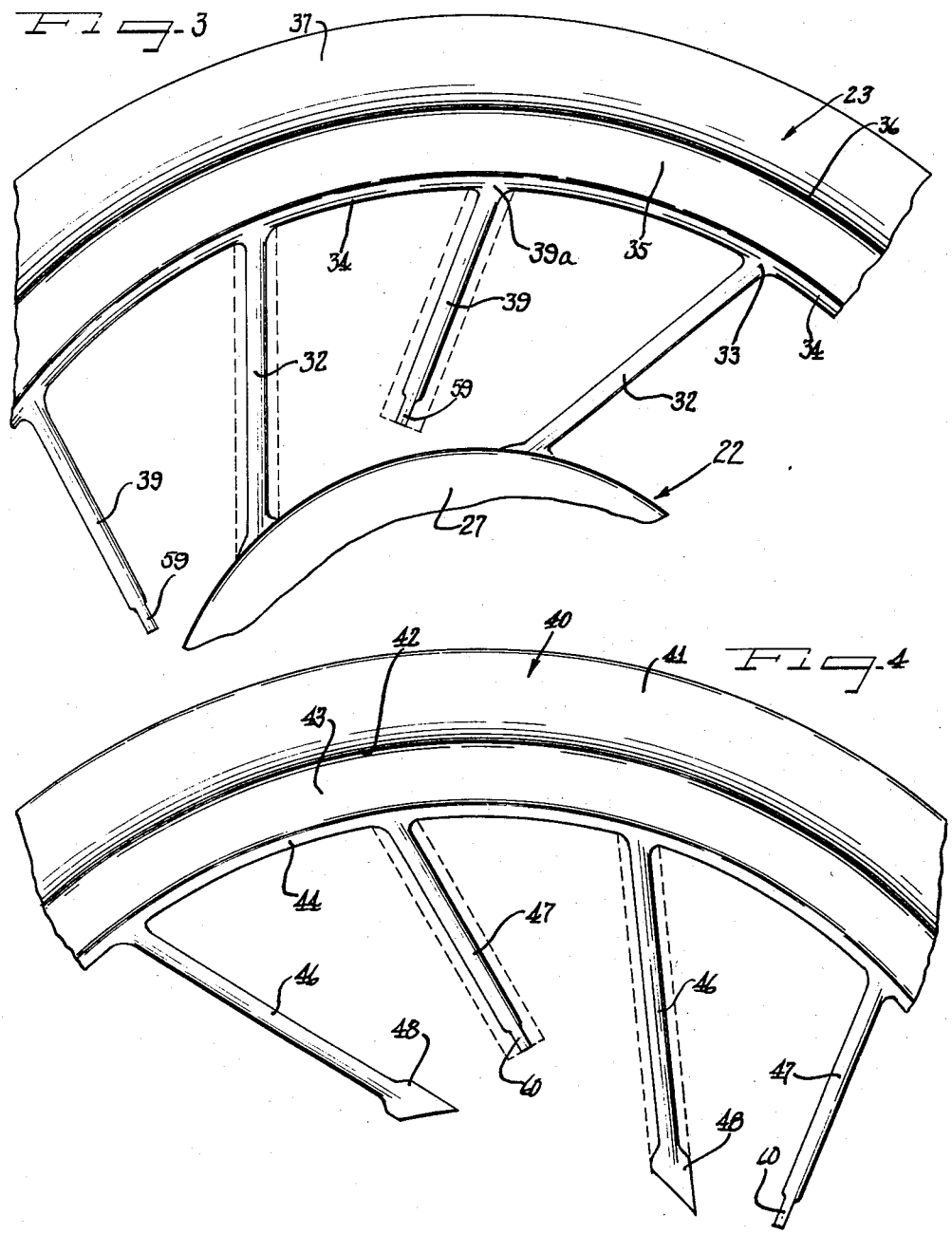

United States Patent Office 2,928,694
Patented Mar. 15, 1960

2,928,694

WIRE SPOKED WHEEL SIMULATING WHEEL COVER

George Albert Lyon, Jr., Birmingham, Mich., assignor to Lyon Incorporated, Detroit, Mich., a corporation of Delaware Application January 17, 1955, Serial No. 482,232

8 Claims. (Cl. 301—37)

The present invention relates to improvements in wheel structures, and more particularly concerns the ornamental and protective covering of the outer sides of vehicle wheels.

An important object of the present invention is to provide a novel wire spoked wheel simulating wheel cover.

Another object of the present invention is to provide an improved wheel structure having novel wire spoke simulating wheel cover means cooperative with the outer side of the wheel.

A further object of the present invention is to provide in a wire-spoke-wheel simulating wheel cover an improved spoke arrangement and means for retaining the spokes in assembled relation.

Other objects, features and advantages of the present invention will be readily apparent from the following detailed description of a preferred embodiment thereof taken in conjunction with the accompanying drawings, in which:

Figure 1 is a front elevational view of a wheel structure embodying features of the present invention;

Figure 2 is an enlarged fragmentary radial sectional view taken substantially on the line II—II of Figure 1;

Figure 3 is an enlarged fragmentary front elevational view of a portion of the outer cover member of the present wheel cover; and Figure 4 is an enlarged fragmentary front elevational view showing a portion of the inner cover member of the present wheel cover.

A cover assembly 10 embodying features of the present invention is adapted to be applied to the outer side of a vehicle wheel comprising a body 11 and a tire rim 12 of the multi-flange drop center type adapted for supporting a pneumatic tire and tube assembly 13.

The tire rim 12 comprises a base flange 15 having a side flange 16 extending generally radially outwardly and slightly axially outwardly. Directed generally axially outwardly and sloping radially outwardly from the side flange 16 is an oblique intermediate flange 17 which merges with a terminal flange 18.

The wheel body 11 is preferably of the disk spider type and comprises a stamping made from suitable heavy gauge sheet metal and having a central bolt-on flange 19 and an outer peripheral attachment flange 20 secured to the base flange 15 of the tire rim. Intermediate the bolt-on flange 19 and the attachment flange 20 is an annular axially outwardly directed nose bulge portion 21.

According to the present invention, the wheel cover assembly 10 is provided with a plurality of spoke-like elements which are constructed and arranged in crossing relation to simulate the spokes of a wire spoked wheel. To this end, the cover assembly 10 comprises a first cover member having an inner or central cover portion 22 and a radially outer cover portion 23. These cover portions are connected by spoke-like elements to simulate the appearance of a wire spoked wheel.

The first cover member comprises a disk-type stamping made from suitable thin gauge sheet metal such as stainless steel, brass, or the like. In assembly with the wheel, a central crown bulge 24 of the central portion 22 is spaced substantially axially outwardly from the bolt-on flange 19. An axially inwardly extending annular side wall flange portion 25 on the crown merges with a generally radially outwardly directed stepped marginal flange crown portion 27 which is reinforced by a generally axially inturned flange 28.

Intermediately in the flange 28 is a fold 29 defining an annular groove 30 opening generally radially outwardly and slightly axially inwardly. The fold 29 forms with the marginal portion 27, an inner radially inwardly opening concealed annular groove 31.

In the present instance, the axially inner margin of the cover flange 28 is provided with an annular series of spaced, elongated spoke-like elements 32 which project radially outwardly and axially inwardly and, in a preferred form are angled peripherally in a clockwise direction when viewed from the outer side of the wheel. As best seen in Figs. 2 and 3, each of the spokes 32 extends toward juncture of the side flange 16 and intermediate flange 17 of the rim, in overlying relationship to the nose bulge 21 of the wheel. Each spoke 32 merges at a reinforced end juncture 33 with a radially and axially outwardly inclined inner peripheral reinforcement flange 34 of the outer annular cover portion 23. For rigidifying and strengthening the spokes 32, and particularly to afford the appearance of wire spokes, the spoke elements are shaped into transversely rounded quarter, half, three-quarter or full round form, from the dotted outline position shown in Fig. 3 to the full outline form, the three-quarter round form being illustrated in Figs. 2 and 3.

The outer annular portion 23 comprises an inner margin 35 extending generally radially outwardly from its reinforcing flange 34 and terminating short of the outer shoulder of rim intermediate flange 17. An intermediate margin 36 extends axially outwardly and slightly radially outwardly inclined from the inner margin. A radially outwardly but slightly axially inwardly inclined outer marginal portion 37 overlies the rim terminal flange 18.

Herein, the inner peripheral flange 34 of the annular ring portion 25 is provided with a plurality of spaced elongated finger extension or spoke-like elements 39, each of which is joined to the inner peripheral reinforcement flange 34 by a short reinforcing juncture 39a, approximately the same length as the reinforced ends 33 of the spokes 32. Herein, the spoke elements 39 project radially inwardly and slightly axially outwardly in spaced relation to the nose bulge portion 21, and are annularly disposed in alternating relation with the spoke elements 32. As best illustrated in Figs. 2 and 3, the spoke-elements 39 are of uniform length, and are somewhat shorter than but angled in the same peripheral direction as the spoke elements 32. However, the spoke elements 39 are obliquely divergent to the inner sides of the spoke elements 32.

For the purpose of forming the spokes 39 into wire spoke simulating shape, they are rounded transversely from the dash outline in Fig. 3 to the full outline form into quarter, half, three-quarter, or full rounds, in substantially the same manner as the spokes 32.

Assembled with the first cover member is a second annular cover member 40 which is preferably made from suitable thin gauge sheet material such as stainless steel, brass, or the like, adapted to be rolled or otherwise formed into shape. Preferably, the second cover member 40 is formed complementary, comfortable to and internested upon the outer cover portion 23 and to this end comprises an annular outer marginal portion 41 engaging on the part 37, a generally axially extending intermediate portion 42 engaging on the flange 36 and an inner marginal portion 43 engaging on the part 35 and terminating in a radially and axially inwardly extending inner peripheral flange 44 upon the flange 34.

Attachment of the second cover member 40 to the outer cover portion 23 is herein accomplished by clamping an underturned extremity flange 45 of the marginal portion 41 about the outer marginal extremity of the cover flange 37.

Herein, the spoke simulating elements of the cover are arranged to assume the appearance of separate tiers or rows of crossed wire spokes to afford the illusion of inner and outer rows of wire spokes connecting a rim to a wheel hub. To this end, the second cover member 40 is provided with annular series of spoke-like extensions projecting generally radially inwardly and slightly axially outwardly from the inner peripheral flange 44. These spoke extensions are generally complementary to and arranged for crossing relation to the spokes 32 and 39 and comprise a series of long spoke elements 46 and a series of short spoke elements 47 disposed in alternating relation and angled peripherally generally counter-clockwise as shown in Figs. 1 and 4. A wire-spoke simulating appearance is effected by transversely rounding the spoke elements 46 and 47 from the dotted outline form shown in substantially the same manner as the spoke elements 32 and 39 of the outer cover member.

The long spoke elements 46 are angularly divergently related to the shorter spoke element 47 similarly, as the spoke elements 32 and 39 and in assembly the long and short spokes of the second cover member 40 are disposed in respective crossing relation to the corresponding spokes of the first cover member. As best seen in Figs. 1 and 2, the long spoke elements 46 cross over the long spoke elements 32 while the short spoke elements 47 cross over the spoke elements 39.

For holding the radially inner ends of the long spokes 46 against axial displacement relative to the spokes 32 of the first cover member, the free end of each of the spokes 46 is provided with a flattened flanged terminal 48 (Fig. 4) which in assembly with the first cover member portion 22 is retainingly engaged within the groove 30 formed by the fold 29 (Fig. 2).

Firm support of the radially inner free ends of the spoke elements 39 and 47 is afforded by means of an annular retainer ring or attachment flange member 50 which may be rolled or formed to shape from any suitable thin gauge sheet material which may be of similar character as the outer and the inner cover members.

The retainer member 50 comprises a generally cylindrical inner flange 51 which, in assembly with the wheel, is axially outwardly spaced from the bolt-on flange 19 and is disposed with its inner edge adjacent the nose bulge portion 22. An intermediate frusto-conical body portion 52 extends generally radially inwardly and axially outwardly from the inner flange 51 and, in assembly, lies behind the inner end portion of the spokes 32. Integral with the inner margin of the intermediate body portion 52 is a generally cylindrical axially outwardly directed flange 53 which terminates in an outturned, annular bead 54 retainingly engaging the fold 29 by interfit within the annular, generally radially inwardly facing groove 31 of the outer cover member.

Means are provided for assembly of the short spokes 39 and 47 with the retainer ring flange 51 by swinging the inner end portions of the spokes into the flange from its inner edge. To this end, the flange 51 is provided with series of alternating short and long keyhole slots 55 and 56 respectively, corresponding in number to the short spoke elements 39 and 47 respectively. These slots 55 and 56 open from the inner edge of the flange 51 and are provided with enlarged eye hole terminal inner portions 57 and 58, respectively, the latter being disposed in the inner cylindrical flange 51 adjacent the intermediate body flange 52, and the former being positioned generally intermediately in the inner flange 51. The eye portions 57 and 58 are adapted to receive therethrough the respective inner end portions of the spokes 39 and 47.

Initially the free end portions of the short spokes 39 and 47 are pinched together to form respective narrow flattened ends 59 and 60 (Fig. 4) which are adapted to slide through the open throats of the slots 55 and 56, respectively, by swinging of the spokes into place until engaged within the eye hole portions 57 and 58.

Permanent interconnection of the radially inner ends of the short spokes 39 and 47 within the respective eye terminals 57 and 58 is accomplished by expanding and spreading open the pinched end portions 59 and 60 into preferably snug engagement with the edges defining the respective slot eye terminals.

In assembling the second cover member 40 with the first cover member portion 22 the terminal flanges 48 are engaged within the retaining groove 30 and the member 40 nested against the outer cover portion 23 with the short spokes 47 extending inwardly through the spaces between the spokes 32. The short spokes 47 are then swung into the slots 56 and the spokes 39 into the slots 55, and the respective terminals 59 and 60 expanded to interlock the same in the eyes 57 and 58.

In the final assembly the pairs of companion relatively long spoke elements 32 and 46 are arranged in spaced annular pattern about the center of the cover in generally X-crossing relation to each other when viewed from the outer side of the wheel cover (Fig. 1). The companion shorter spoke elements 39 and 47 are also arranged in substantially X-crossing relation and are disposed in alternating relation between adjacent pairs of the crossed longer spokes.

For securing the composite wire spoke simulating wheel cover 10 to the outer side of the wheel, the cover is provided with means such as a suitable number of spring retaining clips 62 which are secured to the laminae intermediate flange portions 36 and 42, of the assembled cover members, as by means of rivets 63 which also assist in securing the cover members together. Each of the spring clips 62 comprises a cover engaging base flange 64 which engages the exposed face of the cover flange 36 and has an axially inner end portion curved to conform to the curvature of a shoulder junction of the intermediate generally axially extending flange portion 36 and the inner generally radial flange portion 35, so as to prevent relative turning of the spring clip about the rivet 63. Joined to the base flange 64 is a generally axially inwardly extending radially yieldable resilient ram 65 having a short, stiff radially and axially outwardly directed rim-engaging retaining flange 66 which is adapted to retainingly grip the inclined inner surface of the intermediate rim flange 17 as the cover is applied to the wheel.

In applying the wheel cover 10 to the wheel, the cover is first generally centered with respect to the wheel with the retaining flange terminals 66 of the spring clips 62 engaging the inner surface of the rim intermediate flange 17 adjacent juncture with the rim terminal flange 18. The cover is then firmly pressed home. As the cover 10 is progressively axially inwardly moved, the retaining flanges 66 are cammed along the inclined inner surface of the rim intermediate flange 17 and the fingers 65 are flexibly tensioned by the radially inward deflection thereof, reacting to thrust the retaining flange tips into firm cover retaining engagement with the rim flange. Axially inward movement of the cover is limited by engagement of the peripheral cover flange 45 with the terminal edge of rim flange 18.

Removal of the cover 10 from the wheel can be readily accomplished by means of a pry-off tool (not shown), such as a screw driver, inserted between the rounded outer peripheral edge of the cover and the terminal tip of the rim flange 18, and the application of an outward pry-off force to the outer margin of the cover to release the grip of the retaining finger flange terminal 66 from the tire rim.

It will be understood that modifications and variations may be effected without departing from the scope of the novel concepts of the present invention.

I claim as my invention:

1. In a wheel cover for disposition at the outer side of a vehicle wheel, a first cover member having an annular flat generally radially opening groove therein, and a second cover member having spoke elements projecting therefrom and having flat terminals thereon retainingly assembled in said groove with the walls of the groove in face-to-face relation to the flat surfaces of said terminals.

2. In a cover for disposition at the outer side of a vehicle wheel, a first cover member having a central crown portion with a side wall provided with an inward annular fold providing an outwardly opening groove and an inwardly directed shoulder, said side wall having projecting therefrom a series of elongated spoke-simulating elements joined at their outer ends to an annular portion of the first cover member, said annular portion having a plurality of generally radially inwardly directed shorter spoke-simulating elements intermediate the connecting spoke-simulating elements, a second cover member assembled behind the outer portion of the first cover member and having spoke-simulating extensions therefrom with end portions assembled in said groove and having additional shorter spoke-simulating elements cooperatively related to the short spoke-simulating elements of the outer portion of the first cover member, and a third cover member having a portion thereof connected to said shoulder and having a generally axially inwardly directed inner marginal portion to which the inner end portions of said short spoke-simulating elements are connected.

3. In a cover for disposition at the outer side of a vehicle wheel, a pair of annular cover members assembled together and each having spoke-simulating elements projecting therefrom in relative crossing relation, a circular cover member having a generally axially extending flange, said flange having retaining slots therein opening from one edge thereof and adapted to have the end portions of said spoke-simulating elements engaged in said slots by movement of said end portions through the edge of the flange into said slots, said slots having enlarged inner and terminal portions and said spoke-simulating element end portions being in expanded assembled relation in enlarged terminal portions.

4. A wire spoke-simulating cover including a cover member having swingably connected spoke-simulating elements, a retaining member having a generally axially extending flange provided with generally keyhole slots opening through an edge of the flange and provided with enlarged inner end terminals, said spoke-simulating elements having originally reduced dimension free end portions of a size to move swingably through the throats of the slots into the enlarged terminal portions of the slots, said terminals being of expanded form in snug engagement within the enlarged terminal portions of the slots for maintaining the spoke-simulating elements assembled with said retaining member.

5. In a cover for disposition at the outer side of a vehicle wheel, a central crown cover portion having a marginal axial flange provided with an inturned fold, and a second cover portion having a generally axially extending flange provided with a turned bead on the axially outer end thereof interengaged over said fold within said crown portion to maintain the cover portions in assembled relation.

6. In a simulated wire spoke wheel type wheel cover, a central circular cover structure including a first sheet metal cover portion having radially inner and radially outer sheet metal circular spaced parts connected together by integral spoke simulating elements formed up from the sheeet metal thereof in one piece with said radially inner and outer parts, and a second circular annular sheet metal cover portion superimposed upon and secured to the radially outer first cover portion part and having formed integrally in one piece therewith spoke simulating elements extending generally radially inwardly and axially outwardly through spaces between the spoke simulating elements of the first cover portion and having the radially inner ends thereof connected to the central cover structure spaced axially inwardly from said radially inner first cover part.

7. In a simulated wire spoke wheel type wheel cover, a central circular cover structure including a first sheet metal cover portion having radially inner and radially outer sheet metal circular spaced parts connected together by integral spoke simulating elements formed up from the sheet metal thereof in one piece with said radially inner and outer parts, and a second circular annular sheet metal cover portion superimposed upon and secured to the radially outer first cover portion part and having formed integrally in one piece therewith spoke simulating elements extending generally radially inwardly and axially outwardly through space between the spoke simulating elements of the first cover portion and having the radially inner ends thereof connected to the central cover structure spaced axially inwardly from said radially inner first cover part, said radially outer first cover portion part having thereon and concealed behind the superimposed radially outer cover part and second cover portion cover retaining means for retainingly engaging with a part of a wheel.

8. In a spoke simulating wheel type cover construction, a first circular cover member made from sheet metal in one piece and having circular radially inner and radially outer portions spaced apart and connected together by spoke simulating elements integral in one piece therewith and all of the spoke elements being circumferentially spaced and angled in one circumferential direction from the radially inner to the radially outer portion, said radially outer cover portion having extending integrally in one piece therefrom alternately between said connecting spoke elements additional spoke elements which extend generally radially inwardly and are angled similarly as said connecting spoke elements but have their radially inner ends free from said radially inner cover portion, an annular cover member super-imposed upon the radially outer portion of said first cover member and secured thereto and having extending generally radially inwardly circumferentially spaced alternate series of spoke simulating elements circumferentially angled for and crossingly related to said connecting spoke elements and said alternating additional spoke elements of the first cover member, and means behind said radially inner cover portion and having the ends of the spoke elements of said annular cover member and the ends of the alternating additional spoke elements extending from said radially outer cover portion secured thereto.

References Cited in the file of this patent

UNITED STATES PATENTS

| | | |
|---|---|---|
| D. 170,464 | Jenkins | Sept. 22, 1953 |
| 488,440 | Little | Dec. 20, 1892 |
| 1,969,108 | Tarbox | Aug. 7, 1934 |
| 2,421,756 | Lyon | June 10, 1947 |
| 2,581,424 | Lyon | Jan. 8, 1952 |
| 2,676,850 | McLeod | Apr. 27, 1954 |
| 2,698,768 | McLeod | Jan. 4, 1955 |
| 2,699,361 | Jenkins | Jan. 11, 1955 |
| 2,709,113 | Plotkin | May 24, 1955 |